(12) United States Patent
Kitamura et al.

(10) Patent No.: US 9,031,112 B2
(45) Date of Patent: May 12, 2015

(54) ECHELLE DIFFRACTION GRATING AND ITS MANUFACTURING METHOD, EXCIMER LASER AND ITS MANUFACTURING METHOD

(71) Applicant: Canon Kabushiki Kaisha, Tokyo (JP)

(72) Inventors: Tsuyoshi Kitamura, Utsunomiya (JP); Takashi Sukegawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 13/633,351

(22) Filed: Oct. 2, 2012

(65) Prior Publication Data
US 2013/0089118 A1    Apr. 11, 2013

(30) Foreign Application Priority Data

Oct. 6, 2011    (JP) .................................. 2011-222366
Sep. 10, 2012   (JP) .................................. 2012-198065

(51) Int. Cl.
*H01S 3/22*    (2006.01)
*G02B 5/18*    (2006.01)
*H01S 3/08*    (2006.01)
*H01S 3/225*   (2006.01)

(52) U.S. Cl.
CPC .......... *G02B 5/1861* (2013.01); *H01S 3/08004* (2013.01); *H01S 3/225* (2013.01)

(58) Field of Classification Search
CPC ..... H01S 1/06; H01S 3/0635; H01S 3/08009; H01S 3/0812; H01S 3/0826; H01S 3/10023; H01S 3/1055; H01S 5/1231; H01S 5/141; H01S 5/143; H01S 5/18386; G02B 2005/18; G02B 2006/12107
USPC .................. 372/50.11, 57, 102; 359/558, 571
See application file for complete search history.

(56) References Cited

U.S. PATENT DOCUMENTS

| | | | |
|---|---|---|---|
| 6,067,197 A | 5/2000 | Blasiak et al. | |
| 6,511,703 B2 | 1/2003 | Pan et al. | |
| 2002/0001672 A1 | 1/2002 | Pan et al. | |
| 2009/0027776 A1 | 1/2009 | Schall et al. | |
| 2010/0226014 A1* | 9/2010 | Taira et al. | 359/571 |
| 2010/0328775 A1 | 12/2010 | Kleemann | |
| 2011/0222042 A1* | 9/2011 | Iizuka et al. | 355/71 |

FOREIGN PATENT DOCUMENTS

JP         4549019 B2    9/2010

OTHER PUBLICATIONS

Dmitriy L. Voronov, et al., "5000 groove/mm multilayer-coated blazed grating with 33% efficiency in the 3rd order in the EUV wavelength range", Advances in X-Ray/EUV Optics and Components IV, Proc. of SPIE, vol. 7448 (Dec. 31 2009), pp. 74480J-1 through 74880J-11.
Mar. 15, 2013 European Search Report in European Patent Appln. No. 12006853.1.

* cited by examiner

*Primary Examiner* — Yuanda Zhang
(74) *Attorney, Agent, or Firm* — Fitzpatrick, Cella, Harper & Scinto

(57) ABSTRACT

A manufacturing method for an excimer laser that includes a reflective Echelle diffraction grating includes obtaining information of a wavelength of a light source, a blazed order, a repetitive pitch of the grating, a material of the grating, and a predefined orientation ratio B/A that is a ratio between that a diffraction efficiency A of the blazed order and a diffraction efficiency Bb of an order lower by one order than the blazed order, and determining an initial value of a blaze angle based upon these pieces of information.

8 Claims, 3 Drawing Sheets

ECHELLE DIFFRACTION GRATING AND ITS MANUFACTURING METHOD, EXCIMER LASER AND ITS MANUFACTURING METHOD

BACKGROUND OF THE INVENTION

1. Field of the Invention

The present invention relates to an Echelle diffraction grating, an excimer laser using the same, and their manufacturing methods.

2. Description of the Related Art

A diffraction grating used for the wavelength selection (or narrow band) in an excimer laser serves as an optical element of a laser resonator, and thus needs a high diffraction efficiency and durability for a long-term service. One applicable diffraction grating is an Echelle diffraction grating (blazed diffraction grating) that has an asymmetrical triangular shape on a grating section.

For example, Japanese Patent No. 4,549,019 proposes a method for protecting an Al reflective film surface from being oxidized and deformed, by layering a protective film containing Al2O3 on the reflective film of each grating in the reflective Echelle diffraction grating. In order to propose a method of realizing a high initial value of the diffraction efficiency in the laser installation, U.S. Patent Application Publication No. 2009/0027776 adjusts a thickness of a protective film and U.S. Patent Application Publication No. 2010/0328775 adjusts a groove shape of a diffraction grating.

It is found that a ratio of the diffraction efficiency (orientation ratio) between the blazed order and an order lower by one than the blazed order after a laser beam is irradiated onto the Echelle diffraction grating is different from that before the laser irradiation. This difference means a deformation of a grating groove, and causes the diffraction efficiency of the blazed order to lower. The methods of U.S. Patent Application Publication Nos. 2009/0027776 and 2010/0328775 are insufficient as solutions for this problem.

SUMMARY OF THE INVENTION

The present invention provides an Echelle diffraction grating that can maintain diffraction efficiency for a long-term service, an excimer laser using the same, and their manufacturing methods.

A manufacturing method of an excimer laser that includes a light source configured to emit ultraviolet light, and a reflective Echelle diffraction grating in which each grating has an asymmetrical triangular shape on a section in which a plurality of gratings are arranged includes the steps of obtaining information of a wavelength of a light source, a blazed order set for incident light having the wavelength, a repetitive pitch of the grating, a material of the grating, and an orientation ratio B/A that is a ratio between that a diffraction efficiency A of the blazed order and a diffraction efficiency B of an order lower by one order than the blazed order which satisfies: $0.025 \leq B/A \leq 0.400$, and presenting an available range of an initial value of a blaze angle that is an angle between a blazed surface and a lattice plane of each grating.

Further features of the present invention will become apparent from the following description of exemplary embodiments with reference to the attached drawings.

DESCRIPTION OF THE EMBODIMENTS

Figure 1A:
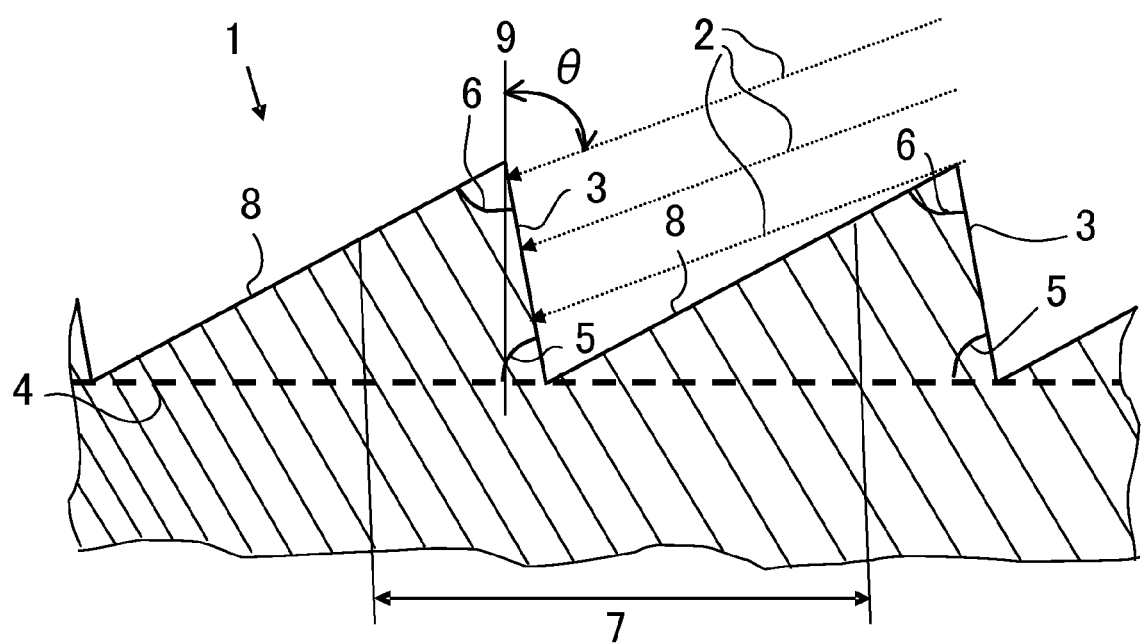
FIGS. 1A and 1B are partially enlarged sectional views of an Echelle diffraction grating according to this embodiment.

FIG. 1A is a partially enlarged sectional view of an Echelle diffraction grating (blazed diffraction grating) 1 according to this embodiment, and this figure illustrates part of a grating section (lattice section) in which a plurality of gratings are arranged. The Echelle diffraction grating 1 is applicable to an excimer laser, such as an ArF (Argon-Fluorine) excimer laser, an KrF (Krypton-Fluorine) excimer laser, a XeCl (Xenon-Chlorine) excimer laser, and a XeF (Xenon-Fluorine) excimer laser. In this case, the Echelle diffraction grating 1 has a mirror and a wavelength-selective function, and thus loses a laser function unless the constant diffraction efficiency is maintained. A description will now be given of an illustration in which this embodiment is applied to an ArF excimer laser.

Each grating includes a blazed surface 3 that is a facet with a short side of an asymmetrical triangular shape on the section illustrated in FIG. 1A, and a counter surface 8 that is an anti-facet adjacent to the blazed surface 3 and has a long side of the asymmetrical triangular shape. In this embodiment, the blazed surface 3 having the short side receives incident light 2 having a wavelength of 193.300 nm most from a light source (not illustrated) of an ArF excimer laser. However, in another embodiment different from this embodiment in which the blazed surface 3 having the short side receives the incident light 2 having the wavelength of 193.3 nm most from the light source (not illustrated), the counter surface 8 having the long side receives the incident light 2 most, and in this case the surface 8 will be referred to as a blazed surface.

An angle between the blazed surface 3 and a lattice plane (grating plane) 4 is referred to as a blaze angle 5. An angle between the blazed surface 3 and the counter surface 8 is referred to as an apex angle 6. Reference numeral 7 denotes a repetitive pitch. While the apex angle 6 is not particularly limited in the present invention, the apex angle 6 of this embodiment is set to an angle smaller than 90° (in particular in a range between 85° and 90°). This is because the incident light 2 reaches the counter surface 8 when a sum of the apex angle 6 and the blaze angle 5 is larger than a sum of the incident angle θ of the light and 90°, and thus this configuration attempts to prevent the light from entering the counter surface when the effective blaze angle 5 and incident angle θ are considered.

An order having the highest diffraction energy amount is referred to as a "blazed order" among light fluxes in a certain usable order range of a predetermined wavelength incident at a predetermined incident angle upon the Echelle diffraction grating 1. A configuration of the Echelle diffraction grating in which the incident light and the diffracted light of the blazed order have equal paths is referred to as a "Littrow configuration." The Echelle diffraction grating 1 has the Littrow configuration. While this embodiment discusses the Echelle diffraction grating having a Littrow configuration in an example, the present invention is not limited to this embodiment and is applicable, for example, to an Echelle diffraction grating having a Czerny-Turner mounting configuration.

As illustrated, in the Echelle diffraction grating 1 having the Littrow configuration, the incident angle θ of the incident light having the blazed order is equal to an angle between the incident light 2 and a grating normal 9 perpendicular to the lattice plane 4. The incident light 2 may perpendicularly enter the blazed surface 3, but enters the blazed surface 3 slightly obliquely in this embodiment. Therefore, in this embodiment, the angle θ of the blazed order is close to but is not equal to the blaze angle 5.

It is known that the following conditional expression is satisfied in the Echelle diffraction grating 1 having the Littrow configuration, where m is a blazed order, λ is a wavelength of the light source of the incident light 2 (therefore which is 193.3 nm in this case), d is a repetitive pitch 7, and θ is an angle of the blazed order:

$$mλ = 2d·\sin θ \quad (1)$$

It is understood from Expression 1 that the order m is uniquely determined once the angle θ if the incident light 2, the repetitive pitch 7, and the wavelength λ of the incident light source are selected. The incident light 2 enters the blazed surface 3 so that Expression 1 is satisfied.

Figure 1B:
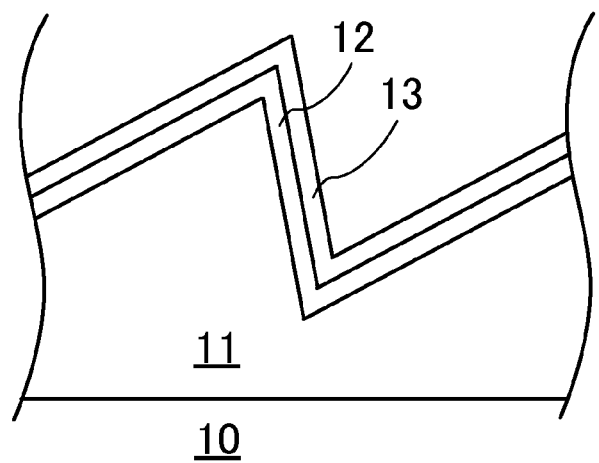

FIG. 1B is a schematic view of a structure of FIG. 1A. The Echelle diffraction grating includes a resin layer 11 having a triangular section made of light curing resin, such as epoxy resin and acrylic resin, on a glass substrate 10, a reflective coating layer 12 made of aluminum and formed on a surface of the resin layer 11, and a protective layer 13 configured to protect the reflective coating layer 12 from being oxidized and formed on the reflective coating layer 12. The protective layer 13 is made of a dielectric film, such as $LaF_3$ film and an $MgF_2$ film.

The resin layer 11 has a thickness between 2 μm and 10 μm, and the reflective coating layer 12 has a thickness between 120 μm and 500 μm. The structure illustrated in FIG. 1B is merely illustrative, and another reflective coating layer may be laminated on the protective layer 13, or the protective layer 13 may be made by laminating a plurality of types of dielectric films.

Figure 2:
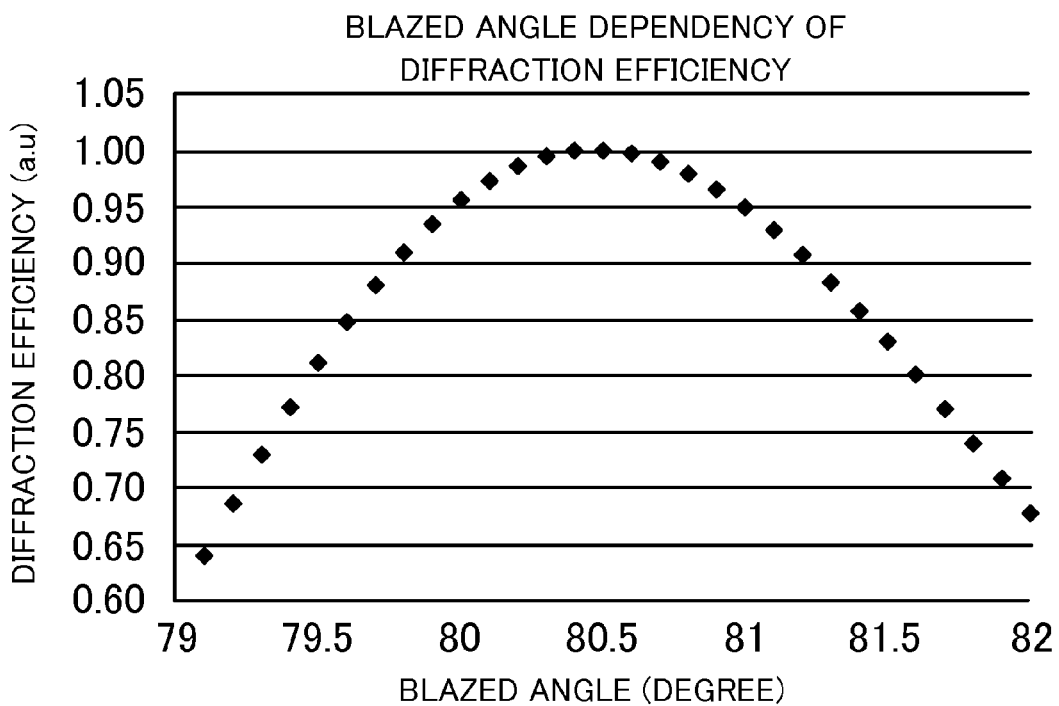
FIG. 2 is a graph of a relationship between a blaze angle and diffraction efficiency for a blazed order in an Echelle diffraction grating.

FIG. 2 is an illustrative graph of a relationship between the blaze angle 5 and the diffraction efficiency for the blazed order in the Echelle diffraction grating having the Littrow configuration. An abscissa axis denotes the blaze angle 5 (°), and an ordinate axis denotes the diffraction efficiency for the blazed order (arbitrary unit).

FIG. 2 is normalized with the highest diffraction efficiency to 1. This calculation result was made by a computer using the rigorous coupled wave analysis ("RCWA").

As illustrated in FIG. 2, the blaze angle 5 can be an angle that maximizes the refraction efficiency of the blazed order. In the conventional Echelle diffraction grating, 80.49° is selected as an initial value of the blaze angle 5 since high efficiency for the blazed order is required.

The conventional Echelle diffraction grating having an initial value of a blaze angle 5 of 80.49° has an initial value of the diffraction efficiency of 62.3% but its diffraction efficiency after irradiations of the twenty billion pulses of the laser beams drops down to 34.2%.

As a result of investigating this cause by addressing an orientation ratio B/A that is a ratio between that a diffraction efficiency "A" of the blazed order m and a diffraction efficiency "B" of an order (m−1) lower by one order than the blazed order, it is found that when the Echelle diffraction grating is used for the ArF excimer laser, the reflective coating layer of the blazed surface 3 or the resin layer under the blazed surface 3 deform and the orientation ratio B/A increases.

As a result of the deformation, a direction of a diffracted light flux changes and the diffraction efficiency lowers. Due to this efficiency deterioration and an efficiency deterioration caused by the surface composition change that is a cause different from the triangular shape, the diffraction efficiency lowers and deviates from a permissible range for the laser application when it is lowered down to 34.2% as described above.

The conventional Echelle diffraction grating initially has high diffraction efficiency. Nevertheless, its diffraction efficiency lowers when the laser irradiation amount become higher, and finally deviates from the permissible range.

According to the Echelle diffraction grating 1 of this embodiment, the initial grating shape is determined so that the orientation ratio B/A that is a ratio between that the diffraction efficiency "A" of the blazed order m and the diffraction efficiency "B" of an order (m−1) lower by one order than the blazed order can become between 0.025 (2.5%) and 0.400 (40%). In other words, in the initial shape, the orientation ratio "B/A" satisfies the following conditional expression. Thereby, the life of the Echelle diffraction grating 1 is extended. The grating shape contains the blaze angle 5, the apex angle 6, and the repetitive pitch 7, and the blaze angle 5 is set so that the following conditional expression is satisfied:

$$0.025 \leq B/A \leq 0.400 \quad (2)$$

A value of the orientation ratio is set so that the efficiency can increase and then decrease due to the deformation in the laser irradiations. As described above, the conventional Echelle diffraction grating has a first blaze angle (80.49°) that maximizes the efficiency of the blazed order as an initial value of the blaze angle 5. On the other hand, this embodiment sets a second blaze angle smaller than the first blaze angle to the initial value of the blaze angle 5. In addition, Expression 2 is used to determine how much amount the second blaze angle is smaller than the first blaze angle.

The orientation ratio smaller than 0.025 weakens the restraining effect of the efficiency deterioration caused by the grating deformation, and the orientation ratio larger than 0.4 causes the initial diffraction efficiency to become remarkably low and the average diffraction efficiency lowers. This numerical range is obtained by investigating the blaze angle dependency of the orientation ratio upon the apex angle 6 and the repetitive pitch 7, then by limiting the apex angle 6 and repetitive pitch 7 to the actually usable ranges, and by finding a range in which the diffraction efficiency of the Echelle diffraction grating 1 is maintained for a long term.

Figure 3:
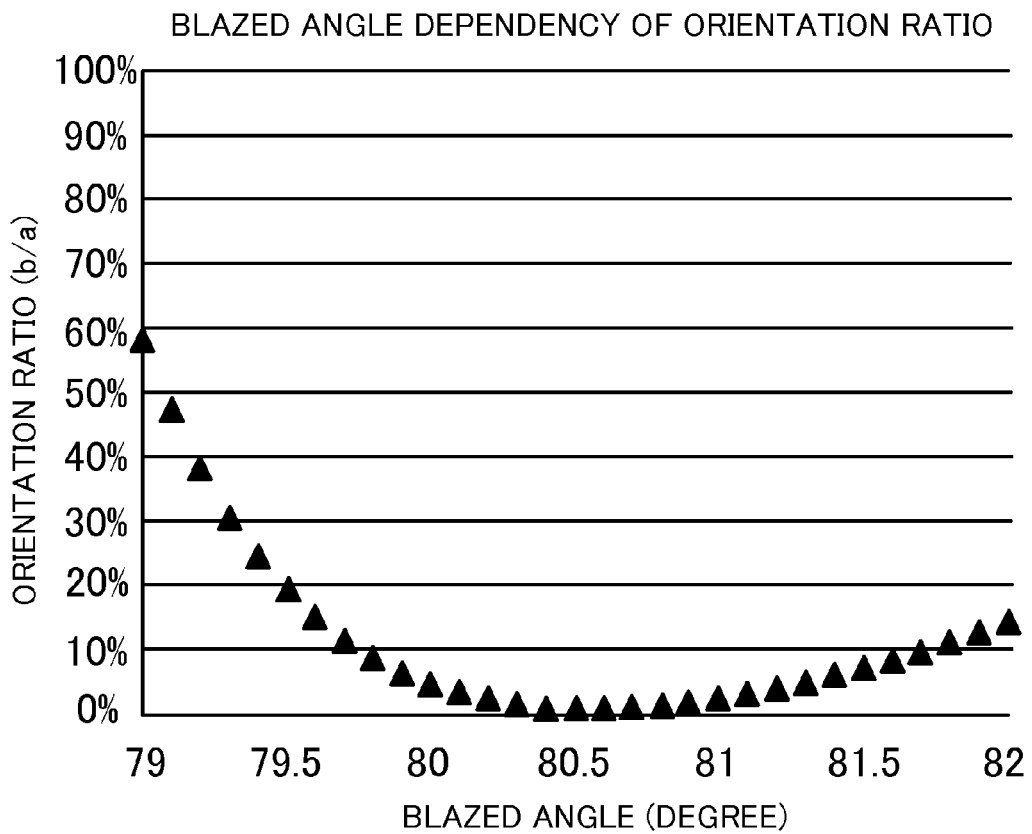
FIG. 3 is a graph of a blaze angle dependency of an orientation ratio.

FIG. 3 is a calculation result of the blaze angle dependency of the orientation ration B/A, where the abscissa axis denotes the blaze angle (°) and the ordinate axis denotes the orientation ratio (no unit). The blaze angle that provides the smallest (minimum) value of the orientation ratio B/A is 80.49° that provides the highest (maximum) value of the diffraction grating of the blazed order in FIG. 2.

By setting the blaze angle 5 utilizing the relationship illustrated in FIG. 3, the durability of the Echelle diffraction grating 1 can be improved. The initial value of the blaze angle 5 is set to 79.80° so that the orientation ratio B/A can be 0.0889 (8.89%).

The blazed surface 3 that receives the laser beam gradually deforms and the orientation ratio "B/A" changes as if the blaze angle increases in FIG. 3. In other words, the orientation ratio B/A decreases in a range smaller than the blaze angle of 80.49°, and the orientation ratio B/A increases in a range larger than the blaze angle of 80.49°.

In FIG. 3, there are two solutions that provide the orientation ratio "B/A" of 8.89%. Referring to FIG. 2, in acrylic resin used for this embodiment, the diffraction efficiency decreases in a range larger than 80.49° due to the deformation corresponding to the orientation ratio change. Hence, in FIG. 3, the blaze angle 5 is selected in a range smaller than 80.49°.

Figure 4:
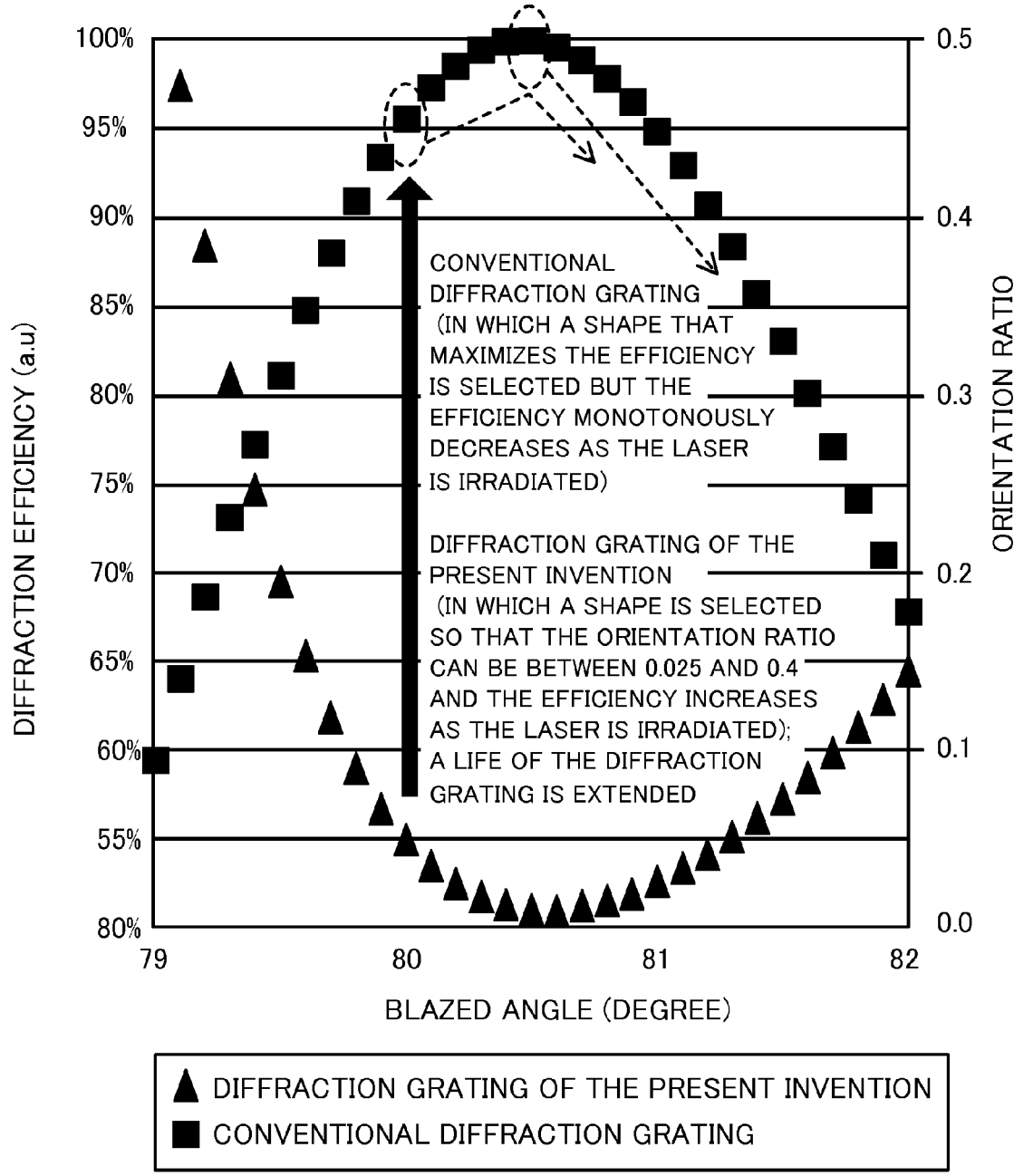
FIG. 4 is a graph of the diffraction efficiency for the blazed order and the blaze angle dependency of the orientation ratio.

The initial diffraction efficiency of 62.3% in the conventional Echelle diffraction grating is higher than the initial diffraction efficiency of 55.2% of the Echelle diffraction grating 1 of this embodiment. However, the diffraction efficiency of this embodiment after the 20 billion pulses becomes 48.0% and remarkably surpasses the conventional diffraction efficiency of 34.2% after the 20 billion pulses. For example, the laser irradiation amount that provides the diffraction efficiency of 35% is 19 billion pulses for the conventional diffraction grating but 36 billion pulses for the Echelle diffraction grating 1 of this embodiment. Therefore, the durability (life) improves 1.89 times. Referring now to FIG. 4, a description will be given of the above phenomenon. The diffraction efficiency monotonously decreases in the conventional Echelle diffraction grating when the grating deforms due to the irradiations. On the other hand, the diffraction efficiency increases in the Echelle diffraction grating of this embodiment when the grating deforms due to the irradiations. As a result, the minimum diffraction efficiency in the irradiation period becomes higher than that in the conventional Echelle diffraction grating, and thereby the life is extended.

Regarding the efficiency variation amount during the irradiation, the initial efficiency of the conventional example decreases 62.3% to 34.2% which corresponds to 54.8% of the initial efficiency, and does not appear to correspond to about 70% of 80.49°+1.4°=81.89°. Apparently, this is due to a cause other than the shape change such as a composition change on the reflective surface. In other words, the reason why the calculation result does not perfectly accord with the actual efficiency change is regarded as influence of the efficiency drop caused by a physical phenomenon different from the deformation, such as surface oxidation.

In addition, the employed blazed order never changes and is constant irrespective of the grating deformations caused by the irradiations. This is because this angle is maintained constant once the incident angle θ of the incident light 2 illustrated in FIG. 1A is set, and the blazed order m is maintained constant from Expression 1.

A deforming direction may be reversed in FIG. 2 according to a material of the grating (or the blaze angle 5 decreases as the laser irradiation amount increases). In that case, in FIG. 3, the life of the diffraction grating can be extended by selecting a blaze angle from a region larger than the conventional blaze angle (80.49°).

This embodiment also serves as a manufacturing method of an excimer laser having a reflective Echelle diffraction grating 1. This excimer laser includes a light source (not illustrated) configured to emit ultraviolet light having a wavelength, such as 193.3 nm, 248.4 nm, 308 nm, or 351 nm, and the Echelle diffraction grating 1. The incident light from the light source enters the blazed surface 3 so as to satisfy Expression 1.

This manufacturing method includes some steps, and each step can be implemented as a program (software) configured to instruct a computer (processor), such as a PC, to execute a function of each step.

Initially, a user operates an input unit of the computer, and inputs a wavelength λ of a light source of Expression 1 (such as 193.3 nm), a blazed order m, and a repetitive pitch d. The applicable wavelength λ of the light source can be 193.3 nm of the ArF excimer laser, 248.4 nm of the KrF excimer laser, etc. An example of the applicable blazed order m can be selected from a range between $96^{th}$ order and $114^{th}$ order for the ArF excimer laser, or between $74^{th}$ order and $89^{th}$ order for the KrF excimer laser.

Next, a user determines an orientation ratio B/A between the diffraction efficiency "A" of the blazed order and the diffraction efficiency "B" of the order (m−1).

In addition, the user inputs information of a material of the diffraction grating (such as a base, a resin layer, a reflective coating layer, and a protective coating layer).

When this information is input (obtained), the computer displays (presents) an available range based upon the set orientation ratio and the deformation tendency of the blazed surface 3 in a map (not illustrated) which illustrates a relationship between the blaze angle (abscissa axis) and the apex angle (ordinate axis). The map (not illustrated) is previously stored in a memory (storage) (not illustrated) of the computer. In response, the user determines (selects) the apex angle 6 and the blaze angle 5 in that range.

When the apex angle 6 is previously determined, the blaze angle 5 may be determined from the graph illustrated in FIG. 3. Whether the blaze angle 5 is selected from the right side or left side of the blaze angle of 80.49° that provides the minimum value in FIG. 3 depends upon the deformation tendency of the employed material.

First Working Example

In the Echelle diffraction grating 1 of the first working example, the repetitive pitch 7 is 10.7081 μm (93.3636 per 1 mm), the blazed order is $109^{th}$ order, and the apex angle 6 is 85.50°. The light having a wavelength of 193.3 nm emitted from the light source of the ArF excimer laser is irradiated onto the blazed surface 3. The Echelle diffraction grating 1 is used as a reflective diffraction grating for the narrow band in the ArF excimer laser and has a Littrow configuration in which the incident angle and the exit angle are both 79.60°.

Before the laser irradiation, the blaze angle 5 is set so that the orientation ratio B/A can be 0.0889 between the diffraction efficiency "A" of the $109^{th}$ order as the blazed order and the $108^{th}$ order on the one order lower side concurrent with the $109^{th}$ order. FIG. 4 illustrates a characteristic of the Echelle diffraction grating 1 of the first working example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2011-222366, filed Oct. 6, 2011, and 2012-198065, filed Sep. 10, 2012, which are hereby incorporated by reference herein in their entirety.

What is claimed is:

1. An Echelle diffraction grating having a plurality of gratings, each of which has an asymmetrical triangular shape on a section in which the plurality of gratings are arranged,
   wherein each grating of the plurality of gratings includes a resin layer made of light curing resin and having a thickness between 2 μm and 10 μm, and a reflective coating layer formed on the resin layer, having a thickness between 120 nm and 500 nm, and made of aluminum, and
   wherein the each grating includes a blazed surface configured to receive and diffract incident light,
   wherein a blaze angle of the each grating that is an angle between the blazed surface of the each grating and a lattice plane is smaller than a first blaze angle that maximizes a diffraction efficiency of a blazed order of light diffracted by the plurality of gratings, wherein the blaze angle of the each grating has a second blaze angle as an initial value which is set so that an orientation ratio B/A that is a ratio between a diffraction efficiency A of the blazed order and a diffraction efficiency B of an order lower by one order than the blazed order can satisfy the following conditional expression:

$$0.025 \leq B/A \leq 0.400, \text{ and}$$

wherein light incident on the plurality of gratings is diffracted by the plurality of gratings on both the blazed order and the order lower by one order than the blazed order.

2. An excimer laser comprising a light source configured to emit ultraviolet light, and a reflective Echelle diffraction grating according to claim 1.

3. The excimer laser according to claim 2, wherein the Echelle diffraction grating has a Littrow configuration in which a direction of incident light from the light source accords with a direction of diffracted light, and wherein the following conditional expression is satisfied where $\lambda$ is a wavelength of the light source, m is the blazed order, d is a repetitive pitch of the grating, $\theta$ is an angle between the incident light and a grating normal perpendicular to the lattice plane:

$$m\lambda = 2d \cdot \sin \theta.$$

4. The excimer laser according to claim 3, wherein the light source has the wavelength of 193.3 nm, and the blazed order is set in a range between $96^{th}$ order and $114^{th}$ order.

5. The excimer laser according to claim 3, wherein the light source has the wavelength of 248.4 nm, and the blazed order is set in a range between $74^{th}$ order and $89^{th}$ order.

6. An Echelle diffraction grating having a plurality of gratings, wherein a blaze angle of each of the plurality of gratings is smaller than an angle that maximizes a diffraction efficiency of a blazed order of light diffracted by the plurality of gratings, wherein the blaze angle of each of the plurality of gratings has an initial value set so that an orientation ratio B/A that is a ratio between that a diffraction efficiency A of the blazed order and a diffraction efficiency B of an order lower by one order than the blazed order satisfies the following conditional expression:

$$0.025 \leq B/A \leq 0.400, \text{ and}$$

wherein light incident on the plurality of gratings is diffracted by the plurality of gratings on both the blazed order and the order lower by one order than the blazed order.

7. The grating according to claim 1, wherein ultraviolet light incident on the plurality of gratings is diffracted by the plurality of gratings on both the blazed order and the order lower by one order than the blazed order.

8. The grating according to claim 6, wherein ultraviolet light incident on the plurality of gratings is diffracted by the plurality of gratings on both the blazed order and the order lower by one order than the blazed order.

* * * * *